US012683931B2

(12) United States Patent
Sharma et al.

(10) Patent No.: US 12,683,931 B2
(45) Date of Patent: Jul. 14, 2026

(54) EDGE PLATFORM SERVICE MESH WITH CONNECTIVITY MODULE FOR HETEROGENEOUS ENDPOINTS

(71) Applicant: Dell Products L.P., Round Rock, TX (US)

(72) Inventors: Anurag Sharma, Cedar Park, TX (US); Michael Emery Brown, Austin, TX (US); Daniel E. Cummins, Hudson, NH (US); Eric Williams, Champaign, IL (US); Dominique Prunier, Montreal (CA)

(73) Assignee: Dell Products L.P., Round Rock, TX (US)

( * ) Notice: Subject to any disclaimer, the term of this patent is extended or adjusted under 35 U.S.C. 154(b) by 253 days.

(21) Appl. No.: 17/872,037

(22) Filed: Jul. 25, 2022

(65) Prior Publication Data

US 2024/0031337 A1      Jan. 25, 2024

(51) Int. Cl.
| | |
|---|---|
| *H04L 9/40* | (2022.01) |
| *H04L 12/66* | (2006.01) |
| *H04L 67/51* | (2022.01) |

(52) U.S. Cl.
CPC .......... *H04L 63/0281* (2013.01); *H04L 12/66* (2013.01); *H04L 67/51* (2022.05)

(58) Field of Classification Search
CPC ..... H04L 63/0281; H04L 12/66; H04L 67/51; H04L 67/289; H04L 67/563; H04L 63/0442; H04L 67/12; H04L 67/61; H04L 63/0823

USPC .......................................................... 370/401
See application file for complete search history.

(56) References Cited

U.S. PATENT DOCUMENTS

| | | | |
|---|---|---|---|
| 2020/0059370 A1* | 2/2020 | Abraham | ............... H04L 9/3263 |
| 2020/0177671 A1* | 6/2020 | Tofighbakhsh | ......... H04L 67/12 |
| 2021/0084117 A1* | 3/2021 | Ovadia | ............... H04L 41/0806 |
| 2021/0160325 A1* | 5/2021 | Lee | ...................... H04L 63/0823 |
| 2022/0094690 A1* | 3/2022 | Tarkhanyan | ............ G06F 9/505 |
| 2022/0200891 A1* | 6/2022 | Keeler | .................... H04L 45/74 |
| 2022/0224637 A1* | 7/2022 | S | ......................... H04L 63/0281 |
| 2024/0171657 A1* | 5/2024 | Sharma Banjade | .... H04L 67/61 |

* cited by examiner

*Primary Examiner* — Jungwon Chang
(74) *Attorney, Agent, or Firm* — Jackson Walker L.L.P.

(57) ABSTRACT

A disclosed edge computing platform includes an edge orchestrator (EO) and one or more distributed endpoints. The EO includes an edge proxy, an edge control plane resource, and a service mesh. The service mesh includes a plurality of services, each of which is paired with a corresponding Envoy proxy. The edge proxy communicatively couples the service mesh to a mesh communication tunnel. The edge control plane resource is configured to enable secure routing based on edge estate data maintained in an external store and ownership authorization data in accordance with a suitable authentication technology (e.g. FDO). Each distributed endpoint includes a downstream connectivity module (DCM) including a DCM proxy coupling the distributed endpoint to the mesh communication tunnel. The distributed endpoints may include edge compute endpoints and external compute fabrics. Disclosed teachings enable secure service-to-service communication across the entire edge estate irrespective of types and location of services.

12 Claims, 4 Drawing Sheets

131 —

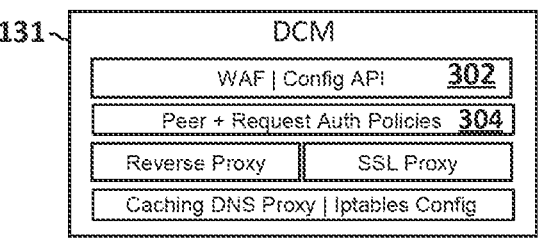

DCM

| WAF | Config API | 302 |
| Peer + Request Auth Policies | 304 |
| Reverse Proxy | SSL Proxy |
| Caching DNS Proxy | Iptables Config |

FIG. 3

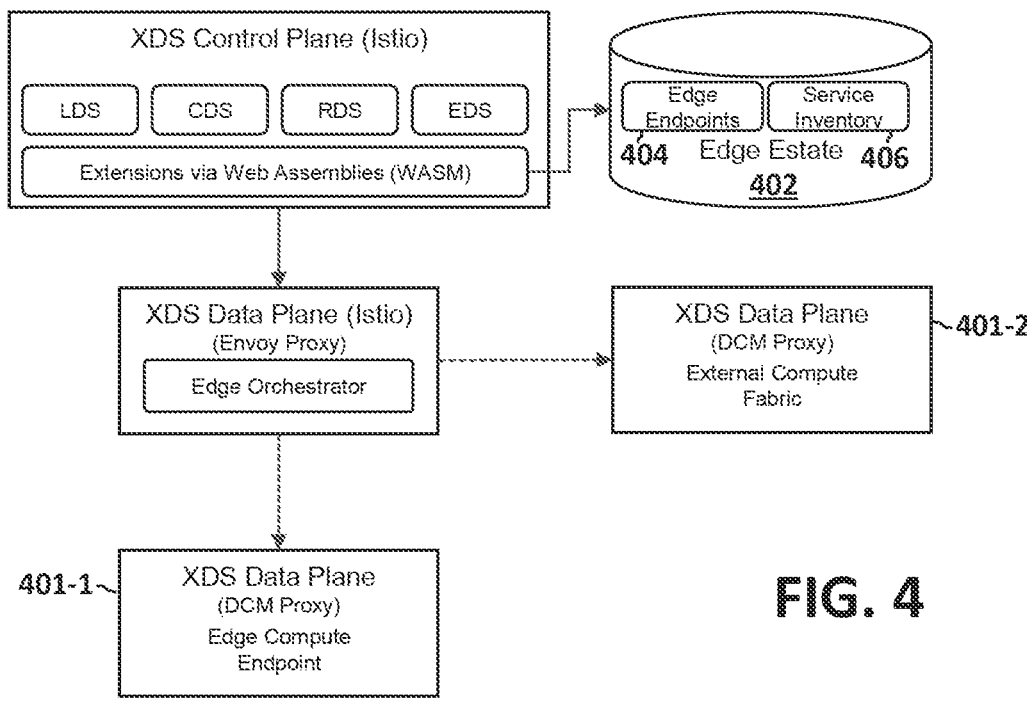

XDS Control Plane (Istio)

| LDS | CDS | RDS | EDS |

Extensions via Web Assemblies (WASM)

Edge Endpoints 404   Service Inventory 406

Edge Estate 402

XDS Data Plane (Istio)
(Envoy Proxy)

Edge Orchestrator

XDS Data Plane
(DCM Proxy)
External Compute
Fabric — 401-2

401-1 — XDS Data Plane
(DCM Proxy)
Edge Compute
Endpoint

| Endpoint | Service:Port:Egress:Ingress | | | | | Meta data |
|---|---|---|---|---|---|---|
| ece-guid.siteId.com | LCMService :443:0:0 | SSHService :22:0:0 | WebSocketService:443:0:0 | gRPCService:443:0:0 | restService:443:0:0 | ... | ← 501-1 |
| ecf-guid.siteId.com | LCMService :443:0:0 | SSHService :22:0:0 | WebSocketService:443:0:0 | gRPCService:443:0:0 | restService:443:0:0 | ... | ← 501-2 |
| eo-guid.siteId.com | IDPService: 443:0:0 | OwnershipSvc:443:0:0 | WebSocketService:443:0:0 | gRPCService:443:0:0 | restService:443:0:0 | ... | ← 501-3 |

↑
502

600

EDGE PLATFORM SERVICE MESH WITH CONNECTIVITY MODULE FOR HETEROGENEOUS ENDPOINTS

TECHNICAL FIELD

The present disclosure relates to distributed computing and, more specifically, edge computing environments and associated infrastructure.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are. configured to implement applications with a group of largely autonomous microservices, sometimes referred to herein simply as services, each of which performs a specific function. Inter-service communication within a service-based application may be supported by a dedicated infrastructure layer generally referred to as a service mesh. A service mesh is typically characterized as having a data plane and a control plane. The data plane may include a network proxy corresponding to each service associated with the application while the control plane may include various task management resources. In the context of a hierarchical edge computing platform, secure inter-service communication is challenging due to many factors including the diversity of runtime execution environments and technologies that are possible at each edge of the platform and the potentially limited compute and storage resources that might be encountered in some endpoints (e.g., an IoT gateway).

SUMMARY

Problems associated with extending a conventional service mesh to distributed heterogeneous endpoints are addressed by teachings disclosed herein.

In one aspect, a disclosed hierarchical edge computing platform includes an edge orchestrator (EO) and one or more distributed endpoints. The EO includes an edge proxy, an edge control plane resource, and a service mesh. The service mesh includes a plurality of services, each of which is paired with a corresponding network proxy such as an Envoy proxy. The edge proxy communicatively couples the service mesh to a mesh communication tunnel. The edge control plane resource is configured to enable secure routing based on edge estate data maintained in an external store and ownership authorization data in accordance with a FIDO-device-onboard (FDO) protocol or another suitable form of authentication technology.

Each distributed endpoint may encompass one or more distributed endpoint resources (e.g., services, devices, K8s runtimes, VM runtimes, etc.), and a downstream connectivity module (DCM) including a DCM proxy coupling the distributed endpoint to the mesh communication tunnel. The distributed endpoints may include one or more edge compute endpoints (ECE)s and one or more external compute fabrics (ECF)s, e.g., vSphere fabric, AWS fabric, etc. In some embodiments, at least one of the ECEs is an IoT gateway device wherein the DCM resides in the gateway device operating system (OS). In some embodiments, at least one of the ECEs is a server-class system provisioned with a management controller such as a baseboard management controller (BMC), a remote access controller (RAC), or the like. In these embodiments, the DCM may reside and execute within the server's management controller.

Disclosed teachings enables secure service-to-service communication across the entire edge estate irrespective of types and location of services. A host OS agent in each ECE and a fabric agent in each ECF securely onboard the compute environment to the EO using, in at least some embodiments, a FIDO protocol such as FDO.

Each ECE host OS agent is supports secure zero touch provisioning (ZTP) of compute environment to enable container and VM workloads based on a device template provided by the EO. Each host OS agent may further provide an interface to the EO for life cycle management, health monitoring, availability and security monitoring of the device.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates elements of an example DCM;

FIG. 4 illustrates elements of a disclosed service mesh including DCM proxies for an ECE and an ECF;

DETAILED DESCRIPTION

Figure 1:
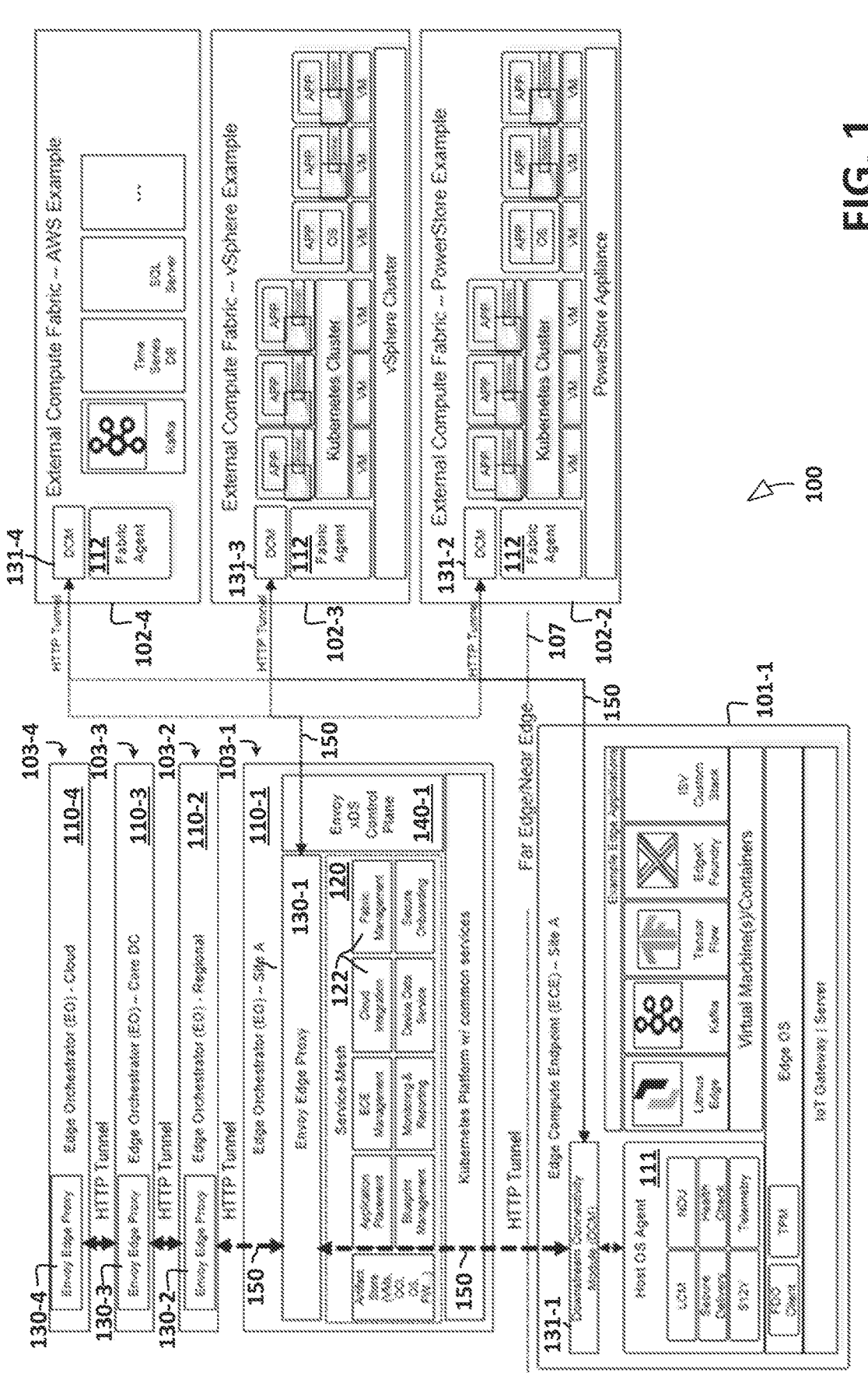
FIG. 1 illustrates an exemplary edge computing architecture.

Exemplary embodiments and their advantages are best understood by reference to FIGS. 1-6, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an exemplary edge computing platform 100 in which disclosed teachings may be applied. The depicted platform 100 includes a group of hierarchically arranged edges 103, each of which includes an EO 110. The edges depicted in FIG. 1 including a site edge 103-1, a regional edge 103-2, a data center edge 103-4, and a cloud edge 103-4.

In accordance with hierarchal arrangement of EOs 110, the regional EO 110-2 of regional edge 103-2 may manage one or more site edges 103-1, the data center EO 110-3 of data center edge 103-3 may manage one or more regions edges 103-2, and so forth.

Each EO 110 may include a service mesh 120, an edge proxy 130, and an edge control plane 140. For the sake of clarity, FIG. 1 omits the service mesh 120 and control plane 140 from all of the depicted EOs except site EO 110-1.

In at least some embodiments, the service meshes 120, edge proxies 130, and control planes 140 illustrated in FIG. 1 embody an Istio service mesh and, for the sake of brevity and clarity, this detailed description may refer primarily or exclusively to Istio-based implementations, but all such references are illustrative rather than limiting.

The illustrated service mesh 120 of site EO 110-1 encompasses various services 122, each of which may be paired with a corresponding Envoy proxy (not depicted in FIG. 1), sometimes referred to as a sidecar proxy, that couples the applicable service 122 to a communication tunnel, identified in FIG. 1 as HTTP tunnel 150, via edge proxy 130-1. The illustrated HTTP tunnel 150 extends between each pair of architecturally adjacent EOs, i.e., between site EO 110-1 and regional EO 110-2, between regional EO 110-2 and data center EO 110-3, and so forth.

In at least some embodiments, each edge proxy 130 and each network proxy associated with a service 122 may be implemented as an Envoy proxy. Generally, an Envoy proxy is an L7 proxy server and communication bus designed for service-oriented architectures. Each Envoy instance is a self-contained process that enables a corresponding service to exchange messages with a local host. Collectively, Envoy instances form a transparent communication mesh that enables any pair of services to exchanges messages without awareness of network topology. An Envoy instance includes an L3/L4 proxy with filter chain mechanism to allow TCP Proxy, UDP Proxy, HTTP Proxy, TLS Client Certificate Authentication, etc. as well as an additional HTTP L7 filter layer for buffering, rate limiting, routing/forwarding, etc. Envoy proxies feature an L7 routing subsystem that supports routing and redirecting requests based on path, authority, content type, runtime values, etc. In addition, Envoy instances may implement advanced load balancing techniques including automatic retries, circuit breaking, rate limiting, request shadowing, and outlier detection. Optionally, an Envoy proxy may consume a layered set of dynamic configuration APIs for centralized management.

Each edge control plane 140 may feature automatic sidecar management with certificate/mTLS configuration for service-to-service communication. In addition, edge control plane 140 may include or support one or more Istio discovery APIs, generally referred to as xDS APIs, that implement an Istio control plane. In such embodiments, the xDS APIs may include a listener discover service (LDS), cluster discovery service (CDS), route discovery service (RDS), endpoint discovery service (EDS) etc.

In accordance with the present teachings, FIG. 1 illustrates HTTP tunnel 150 extending between site edge proxy 130-1 and DCMs 131 provisioned within each of one or more heterogeneous platform endpoints include one or more ECEs 101 and one or more ECFs 102. Generally, the DCMs 131 illustrated in FIG. 1 beneficially enable and support the extension of HTTP tunnel 150 beyond the near edge boundary 107 to platform endpoints 101, 102 so that endpoint resources may communicate securely with near edge services, i.e., all services associated with edges 103-1 through 103-4, in the same way or substantially the same way that the near edges services communicate with each other.

The endpoints 101, 102 illustrated in FIG. 1 include an ECE 101-1 and three illustrative ECFs 102 including a PowerStore ECF 102-1, a vSphere ECF 102-2, and an Amazon ECF 102-3. Those of ordinary skill in the field will recognize the depicted deployment as exemplary and will readily appreciate that platform 100 may include more, fewer, and/or different endpoints. Each DCM 131 depicted in FIG. 1 is coupled to an agent resource of the applicable endpoint. Thus, DCM 131 of ECE 101-1 is communicatively coupled to a host OS agent 111 while the DCMs 131 within each ECF 102 are communicatively coupled to a corresponding fabric agent 112.

Figure 2:
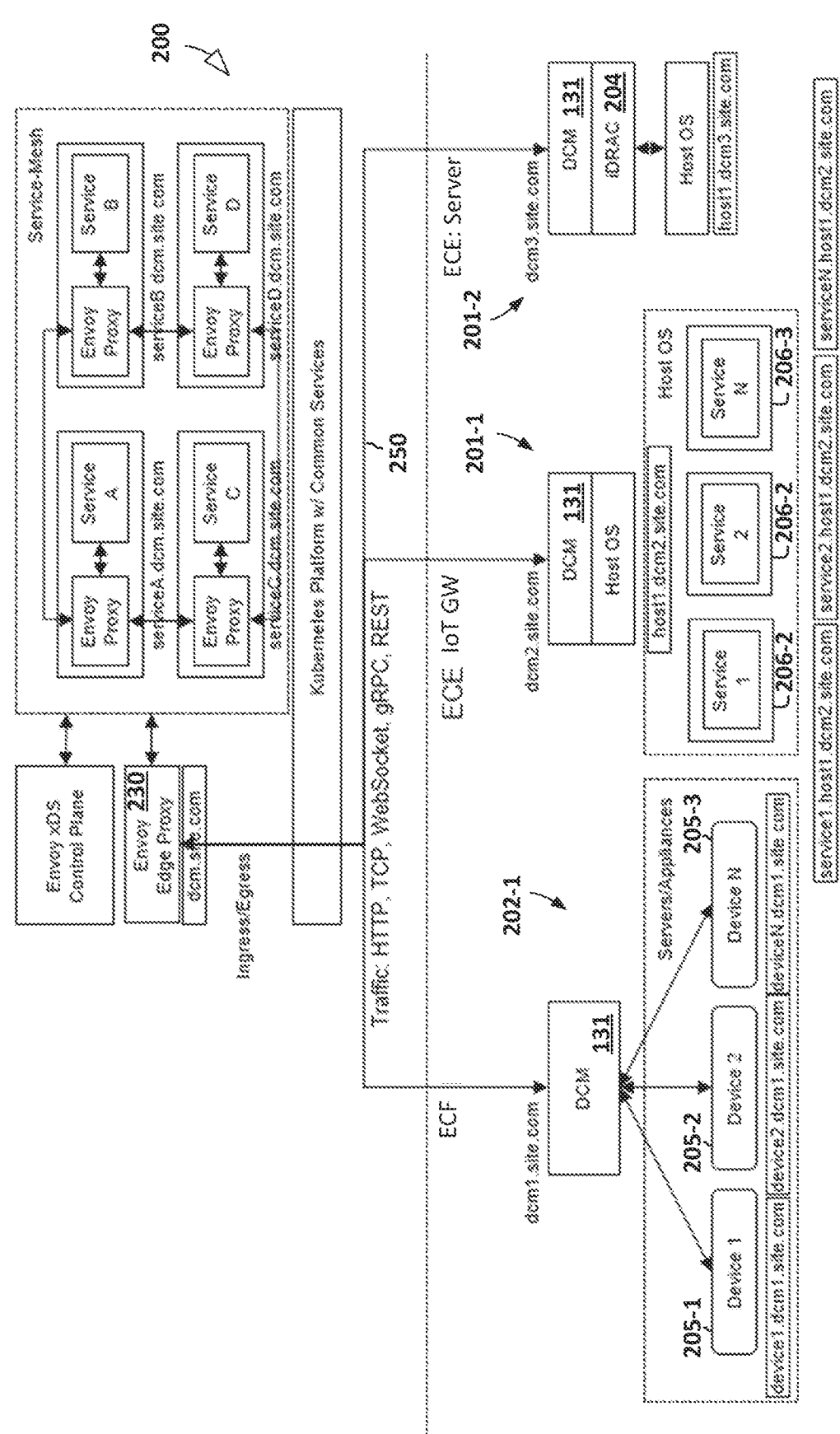
FIG. 2 illustrates a group of heterogeneous endpoints provisioned with a DCM in accordance with disclosed teachings.

Referring now to FIG. 2, an edge computing platform 200 implementing DCMs 131 to couple various platform endpoints 201, 202 to a communication tunnel 250 is depicted. Borrowing from FIG. 1, the platform 200 illustrated in FIG. 2 includes a communication tunnel 250, analogous to the HTTP tunnel 150 of FIG. 1, connecting an Envoy edge proxy 230, analogous to the edge proxies 130 of FIG. 1, and DCMs 131 provisioned on three endpoint devices 201, 202 including a DCM 131 for an ECF 202-1, a DCM 131 installed in an IoT gateway ECE 201-1, and a DCM 131 installed in a management controller 204 of server-class ECE 201-2. Although the management controller 204 of FIG. 2 is illustrated as an integrated Dell Remote Access Controller (iDRAC) from Dell Technologies, other embodiments may employ another brand or type of baseboard management controller, remote access controller, or the like.

The DCM 131 of ECF 202-1 extends communication tunnel 250 couples server/appliance devices 205-1 through 205-3, while DCM 131 of Iot gateway ECE 202-1 couples Host OS services 206-1 through 206-3 to communication tunnel 250, and DCM 131 of server ECE 201-2 exposes a host OS 207 via management controller 204.

Referring now to FIG. 3 as well as FIG. 2, DCM 131 may comprise a lightweight custom L4/L7 proxy implemented in go or another suitable language. In at least some embodiments, DCM 131 comprises a single binary executable suitable for embedding in resource-constrained endpoint environments such as the IoT gateway ECE 201-1 or the management controller 204 in server ECE 201-2. DCM 131 may include capabilities analogous to an Envoy proxy such as dynamic configuration, SSL termination, reverse proxy, forward proxy etc. DCM 131 may employ mutual transport layer security (mTLS) and route-based authorization using an FDO ownership voucher as a root certificate authority (CA). The illustrated DCM may include a Web application firewall (WAF) configuration API 302 and may support request level authentication (304) via industry standard online authorization and identity management tools, e.g., OAuth2 using Keycloak. DCM 131 includes automatic DNS resolution for service discovery and host configuration for network proxy. In at least some embodiments, DCM 131 enables life cycle management, inventory and monitoring of remote endpoints complying with Zero-Touch, Zero-IT and Zero-Trust edge strategies.

In comparison to an Envoy proxy, DCM 131 is sufficiently compact to comply with binary size limitations typical of BMCs, RACs, and other management controllers. In addition, the runtime memory footprint of DCM 131 is smaller than an Envoy equivalent and does not require a separate runtime control process.

Referring now to FIG. 4, each DCM 131 includes a DCM proxy 401 to extend an Istio service mesh to ECE and ECF endpoints including K8s, docker, and VM runtimes, while orchestrating service discovery and peer and authentication policies from an EO leveraging an edge estate store 402 that includes endpoint inventory and service inventory information.

The illustrated edge estate store 402 includes an endpoint configuration—authorization database 404, which may enable FDO secure onboarding of ECEs and FIDO-based password-less registration of ECFs and EO hierarchy, and a service discovery and inventory database 406.

Figures 5, 6:
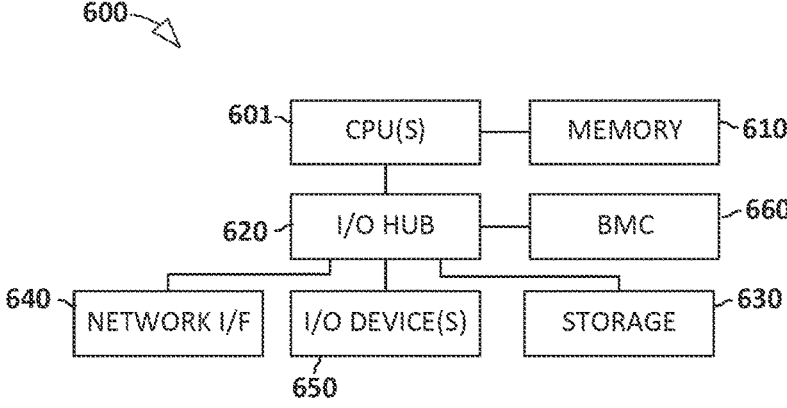
FIG. 5 illustrates an example edge estate database.
FIG. 6 illustrates an information handling system suitable for use in conjunction with disclosed teachings.

FIG. 5 illustrates an exemplary edge estate database 500, suitable for use in conjunction with any one or more of the tasks described. The illustrated database 500 includes endpoints entries 501, three of which are illustrated in FIG. and each of which indicates the entry's FQDN 502 and information, including service name, port, egress, and ingress for each service.

Onboarding-Endpoint Domain Name Generation

During FIDO-based secure device onboarding of an ECE, the EO generates a unique fully qualified domain name (FQDN) for the ECE using a format such as ece-guid.siteId.com and EO provides its own FQDN (eo-guid.siteId.com) to the ECE. Similarly, during FIDO-based password less registration of an ECF, the EO generates a unique FQDN for the ECF in a format such as ecf-guid.siteId.com and the EO provides its own FQDN to the ECF. During FIDO-based password less registration of hierarchical EO at site level, regional level, and global levels, each EO gets a unique FQDN in following format eo-guid.siteId.com.

Provisioning—DCM Installation

During secure zero touch provisioning (ZTP) of an ECE and registration of an ECF, the EO installs and configures a DCM in the ECE and ECF respectively. Note: The EO already includes Istio service with Envoy edge proxy.

Service Inventory

The EO at site level publishes its service inventory to the regional EO and the EO at regional level publishes its service inventory to the global EO and so on. ECF fabric agents and ECE host OS agents publish their service inventory to the site level EO.

Endpoint Proxy Configuration

The Host OS Agent in ECE and Fabric Agent in ECF configure their local network ingress/egress traffic to be proxied through the DCM service. The DCM service in ECE and ECF configure their egress proxy destination to be the site level EO: eo-guid.siteId.com.

Edge Estate Tree

An EO maintains a directory of lower EOs and their connected ECEs and ECFs. A UI/API allows a user to navigate the estate from higher level to find endpoints at lower level with their red/yellow/green status. Each EO updates its local DNS system to help resolve the IP address of endpoints matching with FQDNs generated during onboarding.

The Envoy Edge Proxy in EO at each level and DCM in ECE and ECF may be configured to proxy ingress and egress traffic using mTLS authentication. The mTLS configuration is based on a FIDO ownership voucher. The site level EO is the owner of ECE and EFC. The regional EO is the owner of site level EO and this relationship is established through FIDO onboarding protocol. Similarly, the global EO is the owner of regional EO.

In summary, endpoints across the entire edge estate are ready to proxy ingress/egress traffic. However, no traffic flows without enabling peer and request authentication policies through EO.

The EO provides an interface from the service inventory view to enable/disable service-to-service connectivity across edge estate. It enables admins of higher level EO to delegate certain operations to lower level EO through services/API.

Service Registry

The istiod binary discovers EO services through K8s API Server and adds them into its service registry. The EO extends Istiod (Pilot) using WebAssembly (WASM) to inject service entry custom resource definition (CRD) objects for endpoints based on Edge estate database. The EO includes an intelligent app placement and resource balancing service which deploys independent software vendor (ISV) edge applications across the edge estate based on resource constraints specified in the solution blueprint.

The EO injects service entry CRD objects into istiod for ISV edge applications running outside of EO cluster. The EO automatically adds/removes service entries based on revisions of a solution blueprint. The ISV leverages solution blueprint (IaC) to enable/disable connectivity.

Istiod publishes DNS configuration into sidecar proxies for each service in the service registry. The EO adds virtual services and destination rule CRD objects into istiod to route ingress and egress traffic through gateways.

Certificates

The EO configures istiod (Citadel) to use ownership voucher as root CA certificate for service-to-service communication. Istiod configures sidecar proxies with client and TLS certificates to enable mTLS for service-to-service communication.

Ingress/Egress Gateways

The EO configures ingress/egress proxies through istiod gateway CRD objects. The EO adds a custom authorization filter to istiod for mTLS to ensure the ownership boundaries of service-to-service communication based on ownership voucher and onboarding data. The EO adds a custom authentication filter to istiod to enable customers identify provider, e.g., Keycloak to validate JavaScript Object Notation (JSON) web tokens (JWTs).

DCM Configuration

The DCM receiving ingress traffic from EO checks the client certificate signed by Ownership Voucher. The EO adds TLS authorization filter Envoy Edge Proxy via Istiod to check client certificate of DCM based on ownership chain. The EO calls DCM config API to send Service Entry for ECF. The DCM configures iptables to route ingress and egress traffic based on Service Entry for non-K8s services. The DCM checks peer authentication policy based on client certificate signed by OV. The EO publishes a list of services to ECE and ECF that are enabled for service-to-service communication. The EO has intelligent application placement engine for deploying ISV edge applications across edge estate. The EO adds Service Entry CRD objects for ISG edge applications into Istiod.

Returning to FIG. 4 the ECE DCM proxy 401-1 and ECF DCM proxy 401-2 illustrated in FIG. 4 provide an XDS data plane featuring ingress configuration that supports network address translation (NAT) and IPTable to manage firewalls as well as egress configurations via an API gateway. The ECE DCM proxy 401-1 may enable DNS resolution of EO and ECF services in ECE.

Thus, disclosed teachings enable a secure service mesh across the entire edge estate using password-less strong authentications (FDO and FIDO). Trust is maintained by ownership in the edge hierarchy to enable secure delegation of commands. The service-mesh, once established, does not depend on EO availability for ECE-to-ECF communication from. The disclosed mesh may be integrated with customer provided lightweight directory access protocol (LDAP) or IDP for authentication. The service-mesh may be scaled to millions of distributed (and intermittently disconnected) edge devices without strong dependency on a single XDS control plane. Service discovery and DNS resolution includes ISV deployed applications across the edge estate.

In addition, running the DCM in iDRAC or an analogous resource removes the requirement of an additional compute environment in an on-prem Core DC for establishing remote connectivity with ECFs or on-prem solutions (e.g. Power-Flex, VxRail, PowerStore, etc.) for active management from an apex console.

Referring now to FIG. 6, any one or more of the elements illustrated in FIG. 1 through FIG. 5 may be implemented by, as, or within an information handling system exemplified by the information handling system 600 illustrated in FIG. 6. The illustrated information handling system includes one or more general purpose processors or central processing units (CPUs) 601 communicatively coupled to a memory resource 610 and to an input/output hub 620 to which various I/O resources and/or components are communicatively coupled. The I/O resources explicitly depicted in FIG. 6 include a network interface 640, commonly referred to as a NIC (network interface card), storage resources 630, and additional I/O devices, components, or resources 650 including as non-limiting examples, keyboards, mice, displays, printers, speakers, microphones, etc. The illustrated information handling system 600 includes a baseboard management controller (BMC) 660 providing, among other features and services, an out-of-band management resource which may be coupled to a management server (not depicted). In at least some embodiments, BMC 660 may manage information handling system 600 even when information handling system 600 is powered off or powered to a standby state. BMC 660 may include a processor, memory, an out-of-band network interface separate from and physically isolated from an in-band network interface of information handling system 600, and/or other embedded information handling resources. In certain embodiments, BMC 660 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An edge computing platform, comprising:
an edge orchestrator (EO), wherein the EO includes:
a service mesh including a plurality of services, each of which is paired with a corresponding network proxy;
an edge proxy communicatively coupling the service mesh to a mesh communication tunnel; and
an edge control plane resource coupled to the service mesh wherein the edge control plane resource is configured to enable secure routing based on edge estate data and ownership authorization data; and
a plurality of distributed endpoints, wherein each of the plurality of distributed endpoints includes:
one or more distributed endpoint resources; and
a downstream connectivity module (DCM) including a DCM proxy coupling the distributed endpoint to the mesh communication tunnel;
wherein the plurality of distributed endpoints include:
a first edge compute endpoint (ECE) comprising an Internet of Things (IOT) gateway device ECE, wherein the DCM of the first ECE is implemented as a single binary executable within an operating system of the IoT gateway device ECE;
a second ECE comprising a server ECE wherein the DCM of the second ECE exposes a host OS via a management controller of the server ECE.

2. The platform of claim 1, wherein each network proxy comprises an envoy proxy.

3. The platform of claim 1, wherein the edge control plane resource comprises an envoy xDS control plane.

4. The platform of claim 1, further comprising:
an edge estate database indicative of edge compute endpoints and a service inventory.

5. A method for use in an edge computing platform that includes an edge orchestrator (EO), wherein the EO includes, a service mesh including a plurality of services, each of which is paired with a corresponding network proxy, an edge proxy communicatively coupling the service mesh to a mesh communication tunnel and an edge control plane resource coupled to the service mesh, wherein the method comprises:
providing a plurality of distributed endpoints, wherein each of the plurality of distributed endpoints includes:
one or more distributed endpoint resources and a downstream connectivity module (DCM) including a DCM proxy coupling the distributed endpoint to the mesh communication tunnel; and
incorporating each of the plurality of distributed endpoints into the edge computing platform by coupling each of the DCMs to the mesh communication tunnel;
wherein the plurality of distributed endpoints include:
a first edge compute endpoint (ECE) comprising an Internet of Things (IOT) gateway device ECE, wherein the DCM of the first ECE is implemented as a single binary executable within an operating system of the IoT gateway device ECE; and
a second ECE comprising a server ECE wherein the DCM of the second ECE exposes a host OS via a management controller of the server ECE.

6. The method of claim 5, wherein each network proxy comprises an envoy proxy.

7. The method of claim 5, wherein the edge control plane resource comprises an envoy xDS control plane.

8. The method of claim 5, further comprising:
an edge estate database indicative of edge compute endpoints and a service inventory.

9. An information handling system, comprising
a central processing unit (CPU); and
a memory, accessible to the CPU, including process-executable instructions that, when executed by the CPU, cause the system to perform operations including:
providing a plurality of distributed endpoints, wherein each of the plurality of distributed endpoints includes: one or more distributed endpoint resources and a downstream connectivity module (DCM) including a DCM proxy coupling the distributed endpoint to the mesh communication tunnel; and
incorporating each of the plurality of distributed endpoints into the edge computing platform by coupling each of the DCMs to the mesh communication tunnel;
wherein the plurality of distributed endpoints include:
a first edge compute endpoint (ECE) comprising an Internet of Things (IoT) gateway device ECE, wherein the DCM of the first ECE is implemented as a single binary executable within an operating system of the IoT gateway device ECE; and
a second ECE comprising a server ECE wherein the DCM of the second ECE exposes a host OS via a management controller of the server ECE.

10. The information handling system of claim 9, wherein each network proxy comprises an envoy proxy.

11. The information handling system of claim 9, wherein the edge control plane resource comprises an envoy xDS control plane.

12. The information handling system of claim 9, further comprising:
an edge estate database indicative of edge compute endpoints and a service inventory.

* * * * *